(12) United States Patent
Zandifar et al.

(10) Patent No.: US 7,903,876 B2
(45) Date of Patent: Mar. 8, 2011

(54) DISTORTION CORRECTION OF A CAPTURED IMAGE

(75) Inventors: Ali Zandifar, Cupertino, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 1045 days.

(21) Appl. No.: 11/679,664

(22) Filed: Feb. 27, 2007

(65) Prior Publication Data
US 2008/0205758 A1  Aug. 28, 2008

(51) Int. Cl.
*G06K 9/34* (2006.01)
(52) U.S. Cl. .......................................... 382/176
(58) Field of Classification Search .................. 382/176
See application file for complete search history.

(56) References Cited

U.S. PATENT DOCUMENTS

| | | | |
|---|---|---|---|
| 5,452,374 A * | 9/1995 | Cullen et al. | 382/293 |
| 5,497,236 A | 3/1996 | Wolff et al. | |
| 5,854,854 A | 12/1998 | Cullen et al. | |
| 5,940,544 A | 8/1999 | Nako | |
| 6,330,050 B1 | 12/2001 | Takahashi et al. | |
| 6,816,624 B1 | 11/2004 | Ebisawa et al. | |
| 6,885,479 B1 | 4/2005 | Pilu | |
| 6,954,290 B1 | 10/2005 | Braudaway et al. | |
| 7,602,995 B2 * | 10/2009 | Araki et al. | 382/290 |
| 2002/0054372 A1 | 5/2002 | Takahashi | |

OTHER PUBLICATIONS

Chaudhuri, A.; Chaudhuri, S.; , "Robust detection of skew in document images," Image Processing, IEEE Transactions on , vol. 6, No. 2, pp. 344-349, Feb. 1997.*
P. Kakumanu; N. Boubakis; J. Black; S. Panchanathan; , "Document Image Dewarping Based on Line Estimation for Visusally Impaired," Tools with Artificial Intelligence, 2006. ICTAI '06. 18th IEEE International Conference on , vol., No., pp. 625-631, Nov. 2006.*

* cited by examiner

Primary Examiner — John B Strege
Assistant Examiner — Nirav G Patel

(57) ABSTRACT

Disclosed are embodiments of systems and methods for eliminating or reducing the distortion in a scanned image. Embodiments of the present invention allow for the automatic pruning, de-skewing, and unwarping of an image using document layout information. In embodiments, dominant baselines may be selected by examining the letter regions on boundary baselines rather than examining the entire document layout. The dominant baselines may then be used to reduce distortion in the image. It shall be noted that present invention is robust enough to handle many types of content, including different languages, as well as documents with different layouts. The present invention may also be applied to images obtained from bound documents and flat documents.

14 Claims, 12 Drawing Sheets

Extracted Letter Rectangles with Indexing Grid

DISTORTION CORRECTION OF A CAPTURED IMAGE

BACKGROUND

A. Technical Field

The present invention pertains generally to image processing, and relates more particularly to systems and methods for unwarping or removing the distortion from a scanned image.

B. Background of the Invention

When a copy of a document is desired, a photocopier or scanner is typically used to duplicate the document. The photocopier, scanner, or other such apparatus with image capturing capabilities generates an image of the document. The image may comprise an array of pixels, wherein each pixel has a location within the image and a color value. When taken together in their proper position within the array, the pixels form the image.

A measure of the quality of the image is the degree to which it is an accurate copy of the document. Problems or circumstances may result in the creation of an image that is a distorted version of the document.

A common situation that results in a distorted image occurs when the page of a bound volume is copied, particularly when copied using flatbed scanning. Because the binding of the volume restricts the physical layout of the book, it is not always possible to place the entire page of the bound volume against the scanning surface. The portion of the page proximate to the binding or spine curves away from the scanning surface and may result in an image with distortions.

Often, the content of the page undergoes three major sources of degradation or distortion. First, the portion of the page running along the spine of the volume typically appears shaded. Second, lines, such as lines of text, appear curved because of the curvature of the volume. And third, in some cases, the document may be misaligned with the image capturing device resulting in an image that is tilted or skewed.

It is typically preferred that the image has as few distortions as possible. Thus, it would be beneficial to remove the shading that exists along the spine and to straighten the content. Accordingly, what is needed are systems and methods to remove or reduce the distortion in an image.

SUMMARY OF THE INVENTION

Disclosed are embodiments of systems and methods for removing or reducing the distortion in a scanned image. It shall be noted that aspects of the present invention include rapid distortion amelioration using boundary document layout information, which may be used on documents with different types of content and different layout profiles. It should also be noted that, in embodiments, the present invention uses the content flow of information along the boundary of the document to help rapidly extract representative information that may be used to unwarp the image.

In embodiments, distortion in an image may be removed or reduced by identifying discrete groups, or "letters," in the image and using at least some of those letters to extract information about the skew, warping, or both. In an embodiment, a region may be fit to each of the discrete groups to form a set of regions. In an embodiment, regions that are within a threshold may be joined together and treated as a single discrete group or single region.

A point may be selected for each of the regions to form a set of points corresponding to the set of regions. A minimum area rectangle may be fit to the set of points, and one or more baselines may be extracted by associating a group of regions with a boundary of the minimum area rectangle. The extracted baseline or baselines may be used to reduce skew and/or warping in the image.

In an embodiment, a baseline set of regions may be grouped together if they are intersected by or are within a threshold distance of a common boundary of the minimum area rectangle. In an embodiment, the letter regions of a baseline may also be required to be on a boundary of a convex hull of the set of regions that was used to form the minimum area rectangle.

In embodiments, the image may undergo preprocessing. In an embodiment, preprocessing may prune unwanted regions of an image by examining a distribution of the intensity of the image or a distribution of the content regions of the image. In an embodiment, a divider region may be identified that divides the image into a spine region and a no-spine region. In an embodiment, an intensity distribution may be used to identify the spine/no-spine divider region.

In an embodiment, at least one baseline may be extracted from the no-spine region of the image, and a skew angle may be calculated using an angle of one or more of the extracted baselines. The skew angle may then be used to rotate at least a portion of the image. In an embodiment, the skew angle may be the average (mean, median, or mode) of the angles of the extracted baselines. In an embodiment, the angle of a minimum area rectangle used to extract a baseline may be used to calculate the skew angle.

In embodiments, two dominant baselines may be extracted from a set of points corresponding to a set of regions in the image by fitting a minimum area rectangle to the set of points. A top baseline set of regions may be formed by grouping regions together if they are intersected by or are within a threshold distance of the top boundary of the minimum area rectangle. Likewise, a bottom baseline set of regions may be formed by grouping regions together if they are intersected by or are within a threshold distance of the bottom boundary of the minimum area rectangle. In an embodiment, the regions of the baselines may also be required to be on a boundary of a convex hull of the set of regions that was used to form the minimum area rectangle.

In embodiments, a baseline group may be validated by checking the spatial distribution of its regions. If the baseline group does not exceed a distribution threshold value, the regions forming the baseline group may be removed from the set of regions. The process may be repeated wherein a new minimum area rectangle is formed and a new baseline group is extracted. In an embodiment, a baseline group may be selected based upon its spatial distribution.

In embodiments, having extracted dominant baselines and fit functions to the baselines, the image may be unwarped. In an embodiment, a pixel may be unwarp responsive to its location relative to the baselines.

It shall be noted that present invention may also be embodied in systems. In an embodiment, a system for reducing distortion in an image may comprise a segmenter, a baseline extractor, and an unwarper. The segmenter may segment the image into foreground pixels and background pixels, form the foreground pixels into discrete groups, or letters, and fit a region to each of the discrete groups to form a set of regions. In an embodiment, discrete groups that are very closely spaced may be treated as a single discrete group. The baseline extractor may select a point for each of the regions to form a set of points corresponding to the set of regions, fit a minimum area rectangle to the set of points, group as a first set of regions those regions that are intersected by or are within a first threshold distance of a first boundary of the minimum area rectangle and that are on a boundary of a convex hull of the set of regions, group as a second set of regions those regions that are intersected by or are within a second threshold distance of a second boundary of the minimum area rectangle and that are on the boundary of the convex hull of the set of regions, and fit baseline functions to the first and second sets of regions. In an embodiment, the first and second threshold distances may be the same. The unwarper may then use the functions to remove or reduce distortion in the image.

In an embodiment, the system may also comprise a preprocessor that identifies a divider that divides the image into a spine region and a no-spine region. In an embodiment, the preprocessor may also prune portions of the image.

In an embodiment, the system may also comprise a skew estimator that extracts at least one baseline from the no-spine region of the image and calculates a skew angle using the at least one baseline, and a de-skewer that rotates at least a portion of the image using the skew angle.

In an embodiment, the system may also comprise a spine region of interest extractor that selects the set of regions that is used by the baseline extractor from the spine region of the image.

It should be noted that the present invention may be implemented in any device or system that may be used to scan an image or obtain a scanned image, including without limitation, general or specialized computers, workstations, scanners, multifunction printers, and the like. Aspects of the present invention may be implemented in a wide variety of ways including software, hardware, firmware, or combinations thereof. For example, the functions to practice various aspects of the present invention may be performed by components that are implemented in a wide variety of ways, including discrete logic components, one or more application specific integrated circuits (ASICs), and/or a program or programs of instructions for execution by one or more program-controlled processors. It shall be noted that the manner in which the present invention is implemented is not critical.

Some features and advantages of the invention have been generally described in this summary section; however, additional or different features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
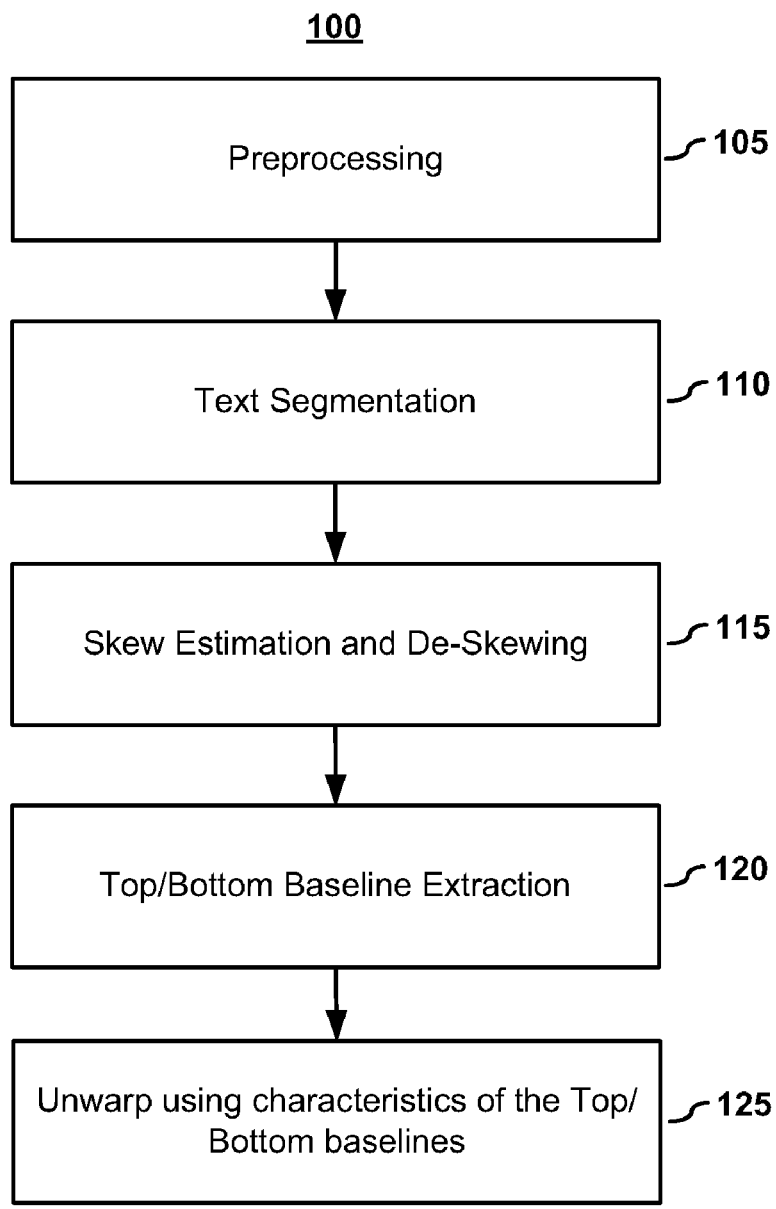
FIG. 1 illustrates a method for reducing or removing distortion from a scanned image according to an embodiment of the invention.

Disclosed are systems and methods for unwarping an input image using boundary information extracted from the scanned image. In embodiments, two dominant baselines may be extracted from the scanned image and used to reduce or remove distortion of the image. In embodiments, two dominant baselines may be selected, in part, by examining the letter spatial locations on boundary baselines rather than examining the entire document layout. It shall be noted that present invention is robust enough to handle many types of content, including different languages such as, for example, English and Japanese, as well as documents with different layouts. The present invention may also be applied to images obtained from bound documents and flat documents.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices. The embodiments of the present invention may be implemented in software, hardware, firmware, or combinations thereof. Components, or modules, shown below in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component. Furthermore, the components may comprise additional functionality, including additional functionality to support the disclosed functionality.

Connections between components within the figures are not intended to be limited to direct connections. Rather, data between these components may be modified, re-formatted, or otherwise changed by intermediary components. Also, additional or fewer connections may be used. It shall also be noted that the terms "coupled," "communicatively coupled," "receives as an input," "coupled to receives information," or the like shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention but may be in more than one embodiment. Also, the appearances of the phrase "in one embodiment" or "in an embodiment" in various places in the specification are not necessarily all referring to the same embodiment. It shall be noted that a set or a group need not contain a plurality of members of the set or the group. It shall also be noted that a point may comprise one or more pixels.

Aspects of the present invention comprise systems and methods for eliminating or reducing the distortion in a scanned image. A scanned image shall be construed to mean a digital version of a hard copy document, that is, a physical medium, e.g., paper, document obtained from a scanner, printer, copier, facsimile machine, or camera. Thus, the terms "scanned document" or "scanned image" as used herein shall mean a digital document generated from a physical document by any of the above-referenced means or by other means.

A. Introduction to Method and System Embodiments

FIG. 1 illustrates an exemplary method 100 for reducing or removing distortion from a scanned image according to an embodiment of the invention. As illustrated in FIG. 1, embodiments of the present invention may be considered to be based on five major steps. A scanned image may undergo preprocessing 105, text segmentation 110, skew estimation and de-skewing (if necessary) 115, robust top and bottom baseline extraction 120, and image unwarping using characteristics of the top and bottom baselines 125. Additional information about these major steps shall be provided with reference to embodiments of systems capable of performing these steps.

Figure 2:
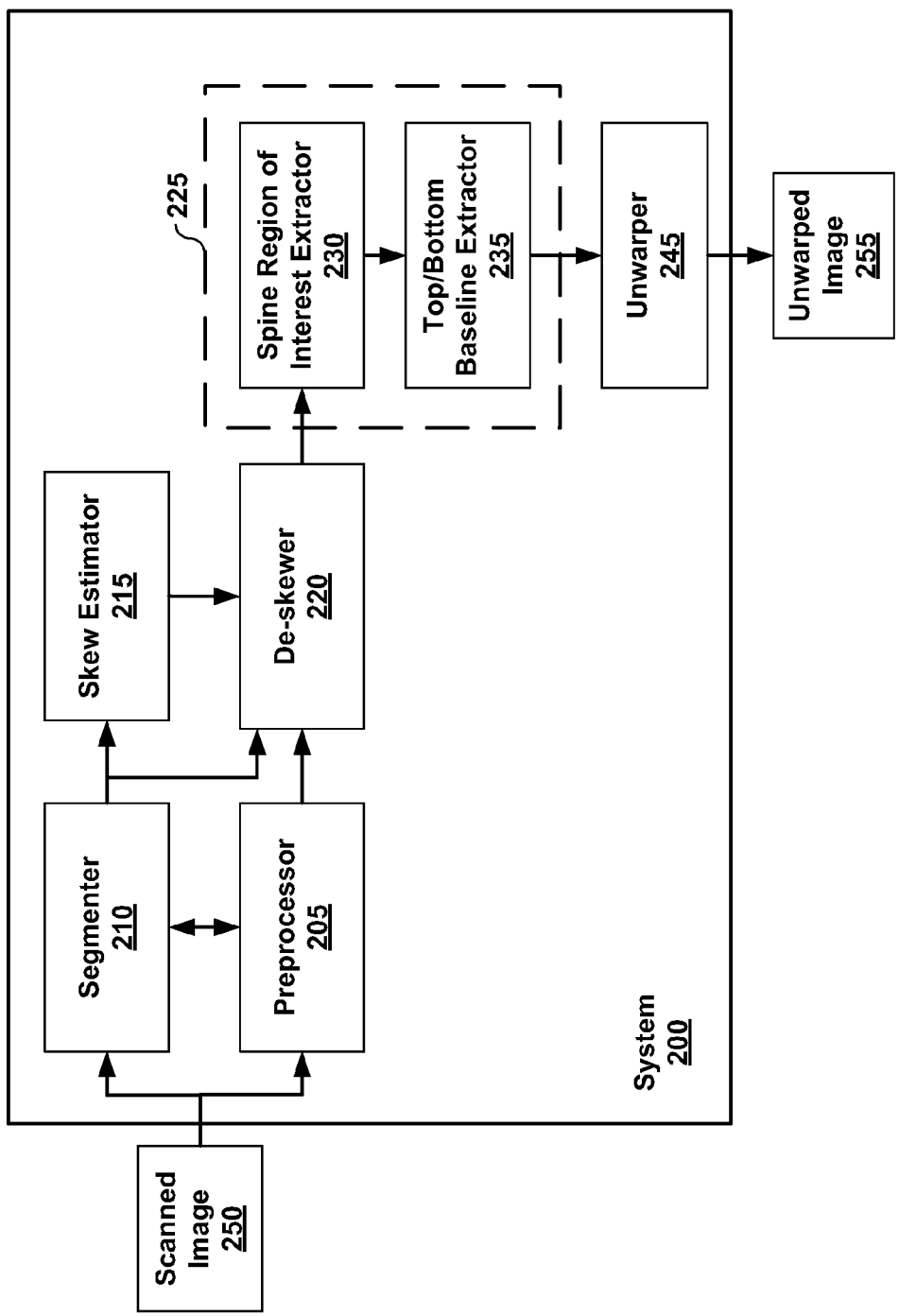
FIG. 2 depicts an embodiment of a system for reducing or removing distortion from a scanned image according to an embodiment of the invention.

FIG. 2 depicts an embodiment of a system 200 for reducing or removing distortion from a scanned image according to an embodiment of the invention. System 200 may perform one or more methods for reducing or removing distortion from a scanned image, including the method depicted in FIG. 1. Illustrated in FIG. 2 is a preprocessor 205, segmenter 210, skew estimator 215, de-skewer 220, baseline extractor system 225, and unwarper 245. In an embodiment, baseline extractor or estimator system 225 may comprise spine region of interest extractor 230 and baseline extractor 235. Each of the system's 200 components and their associated functions shall be described in more detail below.

1. Preprocessing—Pruning and Document Layout

While scanning a document, particularly when scanning a book, a scanner may capture more than one side of the book. For example, a scanner may capture two full pages or may capture one page and a portion of a second page. In either case, it may be beneficial to extract and process a single page at the time. Accordingly, in an embodiment, preprocessor 205 may detect the presence of more than one page and may divide the scanned image into two portions or otherwise prune the image.

Figure 3:
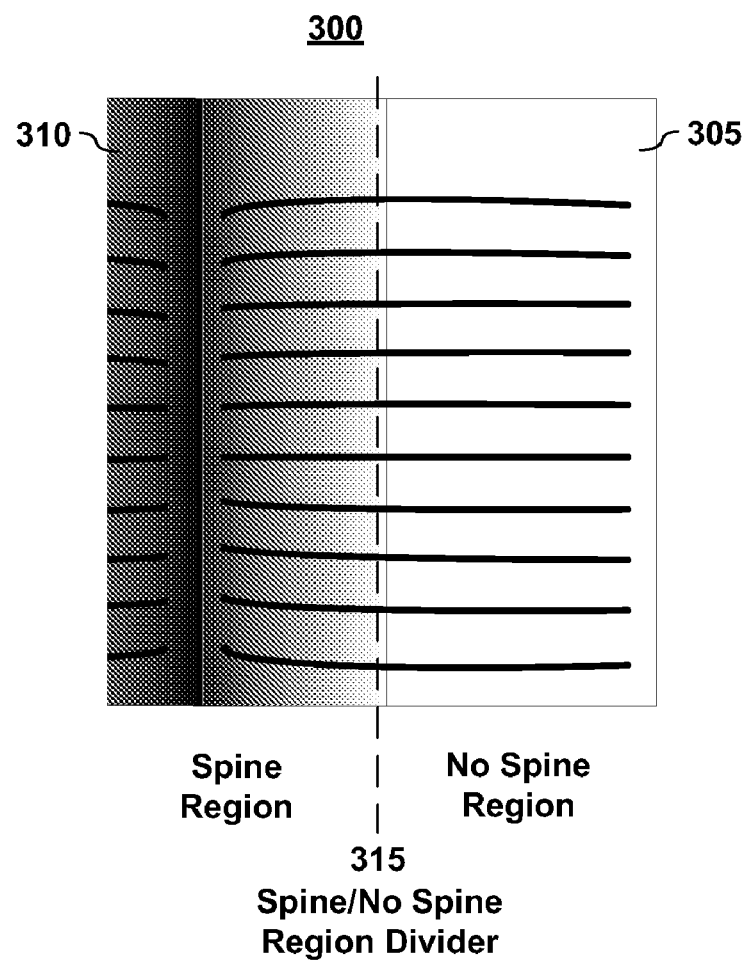
FIG. 3 depicts, for purposes of illustration, an example of a scanned input image according to an embodiment of the invention.

FIG. 3 depicts an example of a scanned image 300 wherein a portion of a page 310 has been captured with the scan of a full page 305. For an image of a bound document, such as the one depicted in FIG. 3, the binding or spine of the volume restricts its physical layout, and the pages of the bound volume will not lay flat against the scanning surface. A portion of the page along the spine of the volume rises above or curves away from the scanning surface. The location or region 315 at which the page starts to rises from the scanning surface may be referred to herein as the "spine/no-spine region divider" in the image.

In an embodiment, preprocessor 205 may automatically detect and prune an unwanted portion, such as portion 310. In an embodiment, this unwanted region cropping may be performed based upon the distribution of content of the scanned image. Information about the content and the content location may be obtained from the segmenter 210. In an embodiment, the region cropping may be done based on the distribution of letters (contents) in the scanned image. For example, if the scanned image partially covers another page, one portion or cluster of the distribution will have more letters than another cluster of the distribution. Also, there will likely be a gap between these two clusters. The portion with the lesser distribution may be pruned. Alternatively or additionally, based on the intensity profile of the scanned image, if a darkest region does not lies at or near the boundary of the scanned image, it may be inferred that part of another page was scanned as well and that portion may be pruned.

In an embodiment, the preprocessor 205 may predict the layout of the image 250 (which shall be construed to mean the image or a modified version of the image, including but not limited to a pruned version of the image), whether it is from the left side or the right side of the book. In one embodiment, the estimation may be based on the vertical profile of the scanned image intensity. As one moves closer to the spine of the book, the image appears darker due to the curving of the book away from the scanner platen. Accordingly, given an intensity distribution of the image, the layout of the book may be determined. For example, if the left side of the image is darker, it can be ascertained that the right page of the book was scanned, and vice versa.

In an embodiment, the intensity distribution may be an intensity distribution of vertical columns of the image. Because the image content on the page varies, the intensity distribution may be filtered or smoothed. In an embodiment, the left or right page layout may be determined by examining a derivative of a filtered intensity distribution. For example, given an intensity distribution with a positive derivative or a derivative that is on average positive, the layout may be assumed to be a right hand page.

Figure 4:
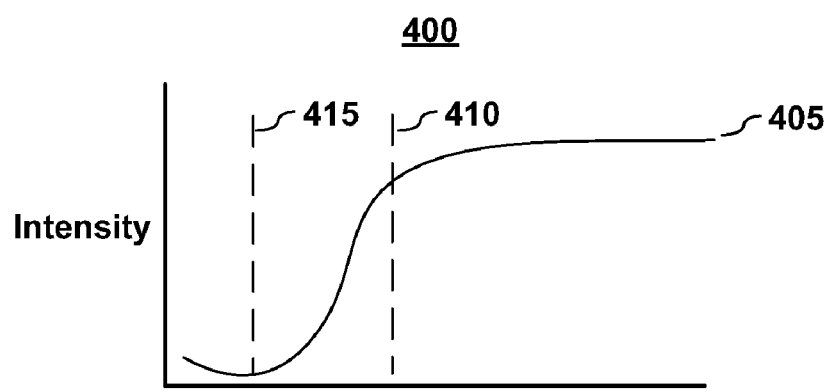
FIG. 4 depicts, for purposes of illustration, an example of an intensity distribution of an input image according to an embodiment of the invention.

FIG. 4 depicts an example of an intensity distribution 400 of an input image similar to the one depicted in FIG. 3. Note that the distribution is very light on the right hand side 405 of the distribution and very dark on the left hand side 415 of the distribution, which indicates that scan is of the right hand side of book.

One skilled in the art shall also recognize that the intensity distribution may also be used to determine a spine region, a spine/no spine region divider, or both. In an embodiment, the spine region may be defined to be the region that is at or near the darkest region 415 of the distribution. The spine information may also be used to prune the image.

In an embodiment, preprocessor 205 may estimate a spine/no spine region divider, such as, for example, divider 315 in FIG. 3, based on intensity of the image. In an embodiment, preprocessor 205 may estimate a spine/no spine region divider based on the intensity, wherein the intensity of vertical columns of the image may be examined to determine the divider region. In embodiments, the spine/no spine region divider may be set at a break point in the intensity distribution or may be set as a threshold value of the intensity. FIG. 4 depicts an example of a threshold value 410 that may define a spine/no spine divider region.

2. Segmenter

In an embodiment, the input to the segmenter 210 may be a scanned image 250 and the output may be a segmented image. The segmented image may be referred to herein as the binarized image of the input image 250. In an embodiment, the binarized image may comprise segmented letters and may have the background removed. In embodiments, the output of segmenter 210 may be used by other processes, such as part of preprocessing, skew estimation, and top/bottom baseline extractor.

In an embodiment, the segmenter 210 may binarize the image using an adaptive thresholding scheme. Global thresholding methods, as opposed to adaptive thresholding methods, typically involve computing a threshold value for an entire image from the two modes on a histogram of the image. However, such methods are insufficient because in a scanned input image, the image histogram typically does not have two modes. Using an adaptive thresholding method instead of using a traditional global binarization scheme is beneficial because it allows for some compensation related to the variations in background due to shading.

In embodiments, adaptive binarization may perform binarization at each image pixel locally. In one embodiment, a threshold may be set for a portion of the image and that threshold may be used to binarize that portion of the image or a subset thereof. Consider by way of illustration and not limitation the following embodiment. Assume that W(x,y) is a local window around a pixel in the image. Local adaptive thresholding allows for the selection an individual threshold for the local window, W(x,y), based on the histogram of the pixels within the local window, W(x,y). Thus, portions of the image may be processed independent of other portions of the image. It shall be noted that such local thresholding allows for thresholding of an image whose global intensity histogram does not contain two distinctive modes that may be used to binarize the image.

In embodiments, documents with different color profiles (e.g., enriched color images) and/or different layout profiles (text/graphics) may also be binarized. In an embodiment, the image may be converted to gray scale or black and white and binarized. In an alternative embodiment, one or more segmentation methods may be used instead of or in conjunction with an adaptive binarization scheme. In an embodiment, one or more segmentation or pixel labeling methods described in commonly-assigned U.S. patent application Ser. No. 11/202,720, filed on Aug. 12, 2005, entitled "LABEL AIDED COPY ENHANCEMENT," by Anoop K. Bhattacharjya (the subject matter of which is incorporated herein by reference in its entirety), may be used to segment the image into foreground and background pixels. One skilled in the art shall recognize that other segmentation or binarization methods may be used to binarize the image. No particular method of binarizing the image is critical to the present invention.

Figure 5:
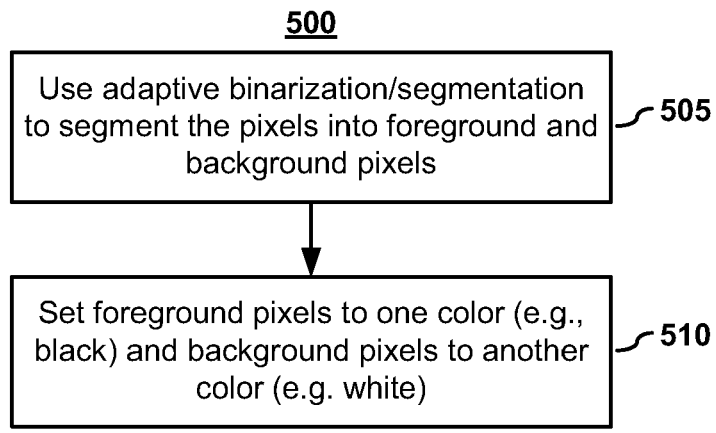
FIG. 5 depicts a method for binarizing or segmenting the image according to an embodiment of the invention.

FIG. 5 depicts an embodiment of a method 500 for segmenting or binarizing the input image 250 according to an embodiment of the present invention. As illustrated in FIG. 5, in an embodiment, adaptive binarization or segmentation may be used to segment (505) the input image 250 into foreground and background pixels. Foreground pixels may be set (510) to one color, such as black, and background pixels may be set (510) to another color, such as white. In an embodiment, the background pixels may be removed from the image for processing.

It should also be noted that one aspect of the binarization is the removal or reduction in shading. By segmenting the image into foreground and background and setting all of the background pixels to a single color or by removing the background pixels, the shading is reduced or removed from the image.

Having segmented the foreground pixels from the image, segmenter 210 may generate labeled "letters" for further use in system 200. It should be noted that the term "letters" is being used because an application of the present invention is the removal of distortion from scanned image of pages with text. However, it shall be noted that the term "letter" shall be construed herein to have a broader meaning. A "letter" as used herein shall mean any discrete group or groups of pixels regardless of whether that group forms a legible character, lexical mark, symbol, figure, or portion thereof.

Figure 6A:
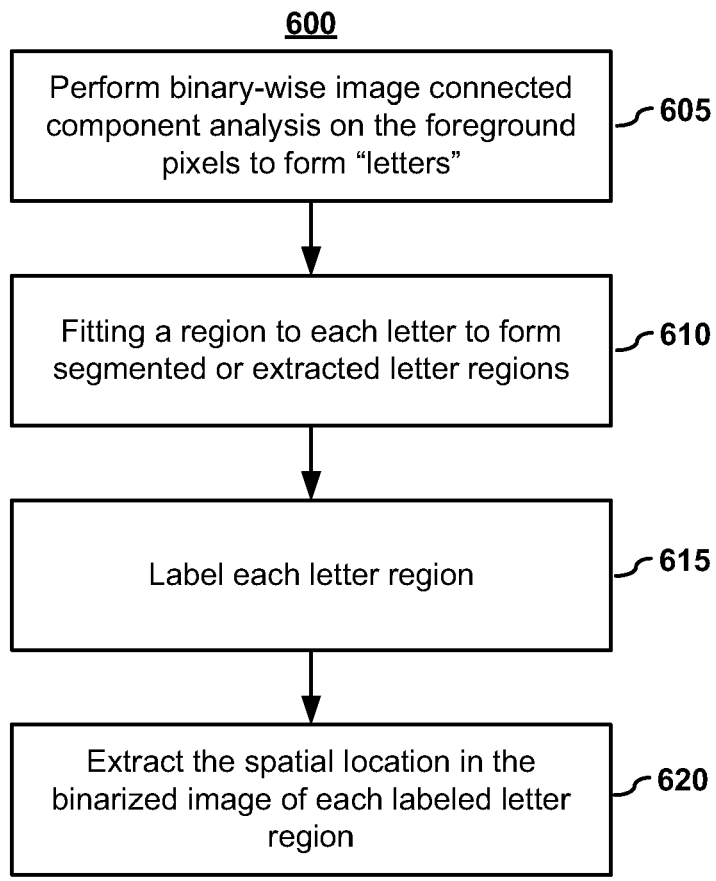
FIG. 6A depicts a method for grouping segmented pixels of an image into "letters" and extracting the spatial locations of the "letters" according to an embodiment of the present invention.

FIG. 6A depicts an embodiment of a method for grouping foreground pixels of an input image into "letter" groups and labeling the letters according to an embodiment of the invention. In one embodiment, segmenter 210 may performs a binary-wise image connected component analysis on the foreground pixels of the binarized image to form (605) "letters." It shall be noted that other methods other than connected component analysis may be used to group foreground pixels into "letters" and that no grouping method is critical to the present invention.

In embodiments, each connected component group, or "letter," may be fitted to a region to form (610) segmented letter region. In the embodiments described herein, a region may be a rectangle although it shall be noted that other regions may be employed. In an embodiment, the rectangle may be formed by finding the tightest bounding rectangle. In one embodiment, the maximum and minimum pixel locations (left, right, top, and bottom) for the letter may be used to form the rectangle. It shall be noted that other methods may be used to fit a region to a connected component group, that the region need not be a bounding region, and that no particular region fitting method is critical to the present invention.

Segmenter 210 may also extract the spatial locations of the letters. As illustrated in FIG. 6A, in an embodiment, the spatial location for the letter regions may be obtained by assigning (615) one or more labels to each letter region. Each labeled letter may be associated (620) with its spatial location in the binarized image. In an embodiment, the spatial location may represent the pixel locations of the letter regions. Alternatively, a grid system may be used as a reference to associate (620) spatial location of letters within the binarized image.

Figure 6B:
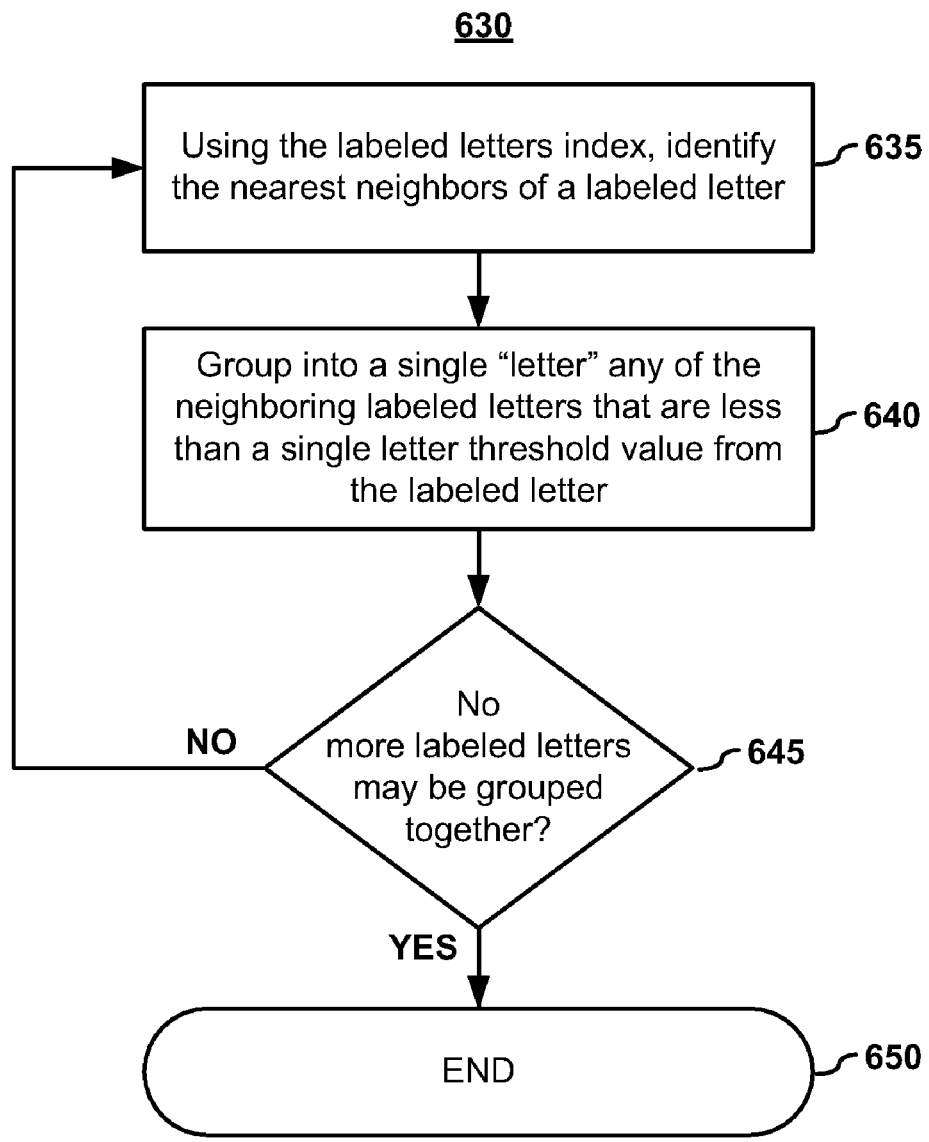
FIG. 6B depicts a method for grouping "letters" into a single "letter" according to an embodiment of the present invention.
Figures 6C, 6D:
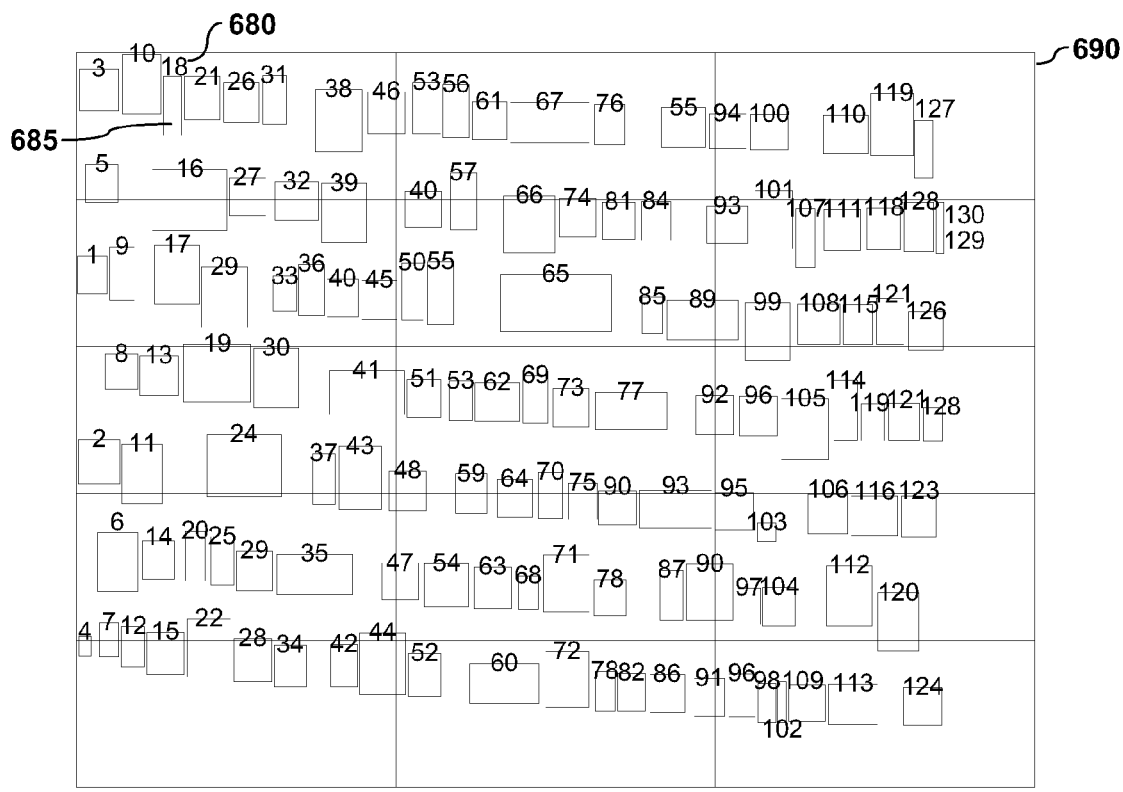
FIG. 6C depicts, for purposes of illustration, a portion of a binarized/segmented image according to an embodiment of the invention.
FIG. 6D depicts, for purposes of illustration, labeled letters extracted from the image of FIG. 6A and a letter index grid according to an embodiment of the invention.

FIG. 6C depicts, for purposes of illustration, a portion of a binarized/segmented image 660 according to an embodiment of the invention. FIG. 6D depicts, for purposes of illustration, labeled letters extracted from the image 660 of FIG. 6C and a letter index grid 690 according to an embodiment of the invention. It should be noted that each letter has a letter region (e.g., region 685) and a letter label (e.g., label 680). It shall be noted that no particular indexing, labeling, location extraction method or grid layout is critical to the present invention.

In embodiments, to more precisely identify certain letter groups, grouping of letters regions may be performed. In an embodiment, if letter regions are within a threshold distance, the letters may be joined into a single "letter." Because certain characters, particularly some language characters (e.g., English, Japanese, and Chinese characters), are formed of more than one connected component group, it may be beneficial to join them together. Typically, the marks that form these characters are closely spaced. Thus, in embodiments, letter rectangles that are within a threshold distance, such as (by way of example and not limitation) within 2-5 pixels, may be treated as a single letter. In an embodiment, the letters may be treated as a single letter by merging their letter regions. In an alternative embodiment, the letters may be treated as a single letter by fitting a new region to both connected component groups. For example, a new bounding rectangle may be fit so that it bounds both connected component groups.

In embodiments, the single letter threshold distance may be preset or may be determined by examining the spacing of the letters. In an embodiment, the single letter threshold distance may be set by examining the spacing distribution, wherein modal distributions may indicate one or more distances that may be used as a threshold distance or distances.

FIG. 6B depicts a method for grouping "letters" into a single "letter" according to an embodiment of the present invention. Using the labeled letters, for a query letter, a neighborhood of labeled letters may be identified (630). In an embodiment, the neighborhood may be the K-nearest neighbors. By using the indexed letters and identifying a neighborhood of letters, the grouping may be performed quickly. As explained previously, letters that are within a threshold distance (i.e., a single letter threshold distance) may be grouped (640) into a single "letter." Consider, by way of example, the two discrete groups 665 and 670 in FIG. 6C. Those two "letters" typically form a single character, "j". By using the present method, letters 665 and 670 may be merged into a single "letter" 685 as shown in FIG. 6D. In an embodiment, the process may be iteratively performed (645) until no more (650) letter groups may be joined.

In embodiments, the letter labeling, indexing, or both may also be updated when letters are grouped into a single letter. In an embodiment, updating may occur during each iteration; or alternatively, updating may be performed at the end of the grouping process. Note that in the depicted embodiment of FIG. 6D, the new single letter 685 has been assigned a single label 680, which may have its spatial location indexed according to grid 690.

3. Skew Estimation

In an embodiment, system 200 may include a skew estimator 215 and a de-skewer 220. Skew estimator 215 and de-skewer 220 may be used to correct distortion related to misalignment or tilting of the image in the plane of the scanning surface. It shall be noted that skew adjustment may be optionally performed.

In an embodiment, the input to the skew estimator 215 may be the binarized image of the no-spine region of the input image 250. Recall that the no-spine region of the image is the portion of the image which maintains contact with the scanner surface. In this region, straight lines in the document may be mapped into straight lines in the image domain. Thus, by estimating the angle of the straight baselines, a skew angle may be obtained.

Figure 7:
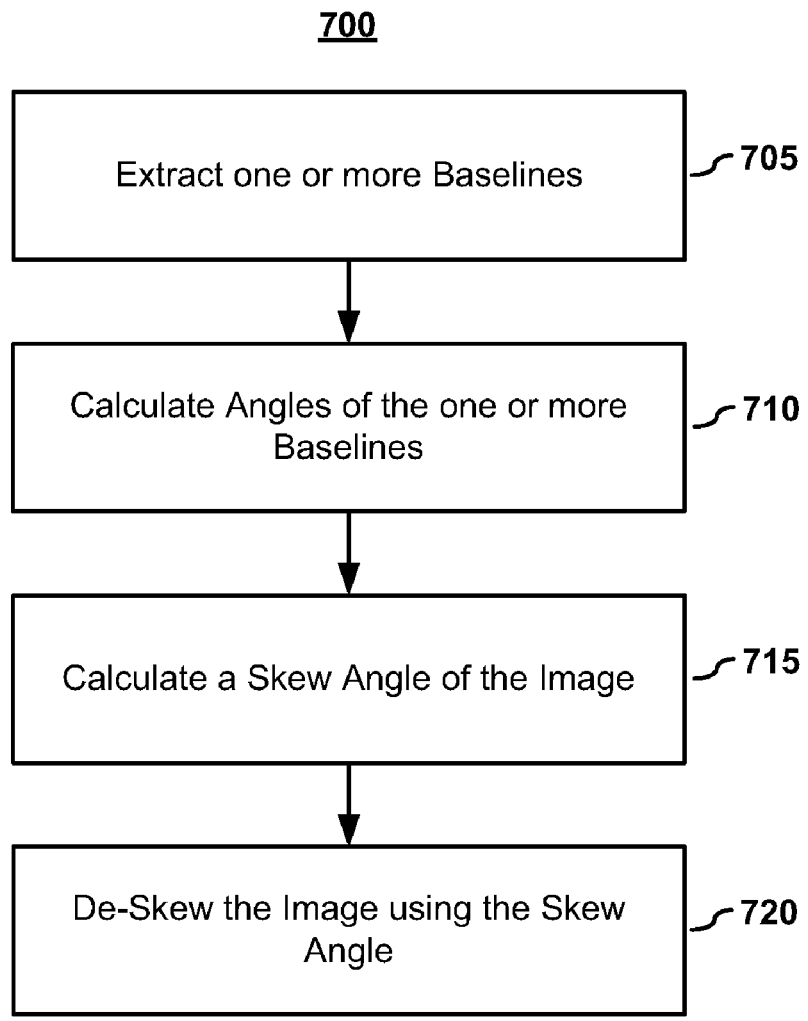
FIG. 7 depicts a method estimating a skew angle of the image and for de-skewing the image according to an embodiment of the invention.

FIG. 7 depicts an embodiment of a method for correcting skew in an image according to an embodiment of the present invention. The depicted method begins by extracting (705) one or more baselines from the no-spine region.

Figure 8:
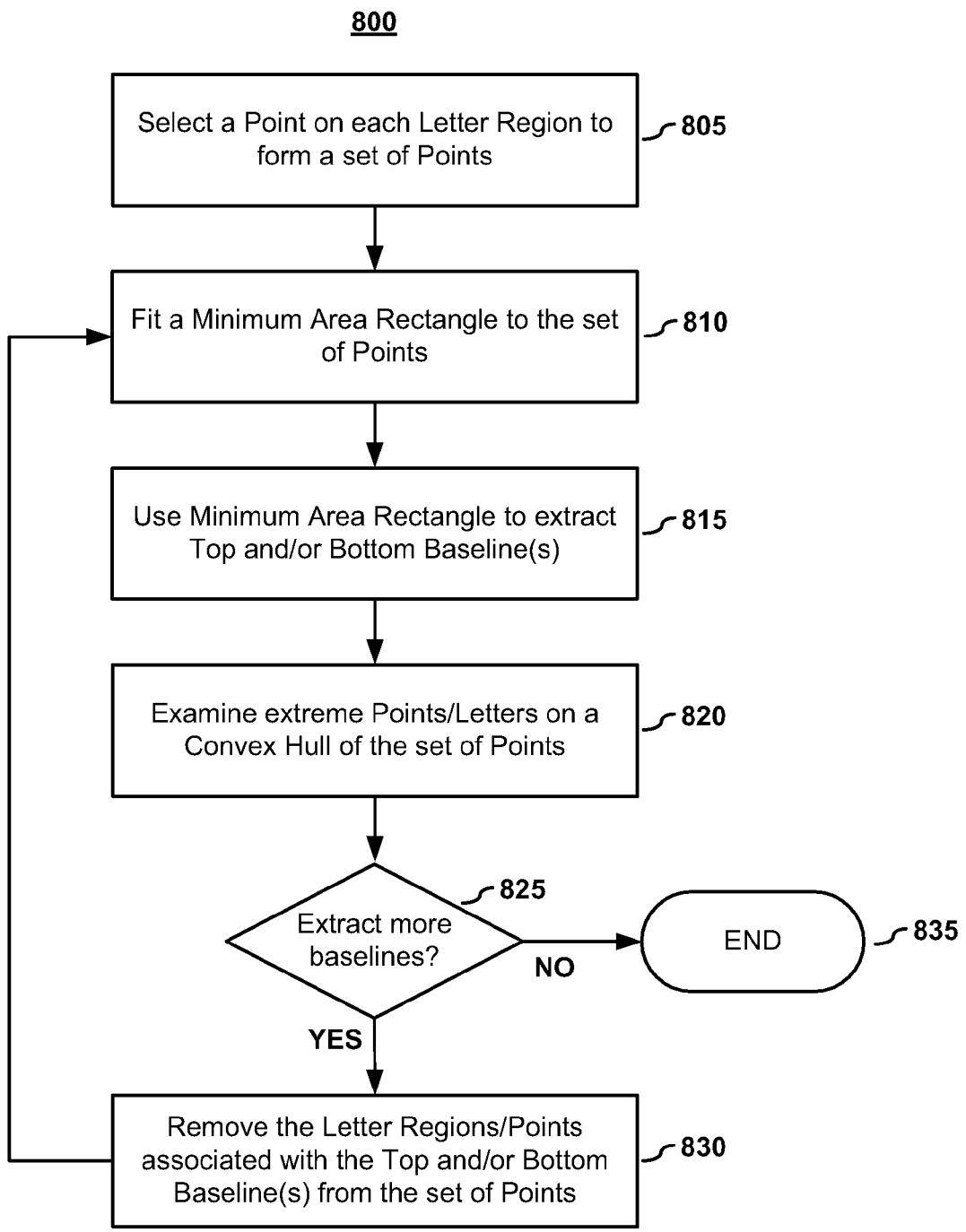
FIG. 8 depicts a method for estimating or extracting a baseline according to an embodiment of the invention.

FIG. 8 depicts an embodiment of a method for estimating a baseline in an image according to an embodiment of the present invention. Because the spatial location information is known for each labeled letter, a point for each labeled letter may be selected (805). In an embodiment, the point of a labeled letter may be the centroid of the labeled letter region; or alternatively, the point may be at some other location, such as the bottom middle of a labeled letter region.

Given a set of points, a rectangle may be fit to the set of points. In an embodiment, a minimum area rectangle may be fit (810) to the set of points. Having obtained a rectangle that has been fitted to a set of points, a top baseline group of letters, a bottom baseline group of letters, or both may be selected by examining locations of letters relative to the boundary of the rectangle. In an embodiment, a top and a bottom baseline may be extracted by selecting those letter regions that reside at or are intersected by the top and bottom boundaries (respectively) of the minimum area rectangle. In an embodiment, a letter region may be associated with a boundary if the boundary of the rectangle intersects the letter region or if the letter region is within a threshold distance.

In embodiments, one or more additional constraints or checks may be applied while selecting groups of letters to form baselines. In an embodiment, a convex hull of the points may be form (820) to identify the extreme letter regions. Letter regions selected as being at or near a minimum area rectangle boundary may be checked to ensure that they also reside at a boundary of the convex hull. It shall be noted that checking that the letter regions are at the boundary of the convex hull may be optionally performed. Because the no-spine region of the image is likely to have been subjected to skew distortion only (and not both skew and warping distortion), one or more of the boundaries of the minimum area rectangle are likely to coincide with the boundaries of the letters regions. Thus, top and bottom letter regions are likely to be intersected by the top and bottom boundaries of the minimum area rectangle, and step (820) may not be performed.

In an embodiment, additional baselines may be extracted. Additional baselines may be extracted by removing (830) from the set of points those points associated with letters that were selected for the one or more extracted baselines. The process may then be repeated by fitting (810) a subsequent minimum area rectangle to the reduced set of points.

Returning to FIG. 7, an angle for each of the one or more extracted baselines may be estimated (710). In an embodiment, the orientation of the minimum area rectangle used to extract a baseline may be used (820) as the angle of the baseline. Alternatively, a line or rectangle may be fit to each baseline using the points of the baseline or the letters regions. It shall be noted that no particular method for determining an angle of a baseline is critical to the present invention.

A skew angle may be calculated (715) based upon one or more of the extracted baseline angles. In one embodiment, the skew angle may be calculated (720) as an average (mean, median, or mode) angle of the baseline angles. The skew angle may then be used to de-skew (720) the image. In an embodiment, the scanned input image may be de-skewed by using a rotation matrix, $R(-\theta)$, where:

$$R(\theta) = \begin{pmatrix} \cos(\theta) & \sin(\theta) & 0 \\ -\sin(\theta) & \cos(\theta) & 0 \\ 0 & 0 & 1 \end{pmatrix}$$

One skilled in the art shall recognize other methods for correcting the rotation or skew of an image may be used. It shall be noted that no particular method for correcting skew is critical to the present invention.

4. Dominant Baseline Extraction

In the system depicted FIG. 2, baseline extraction system 225 may receive the image and letter information and robustly estimate two dominant baseline functions' coefficients. In embodiments, the baseline extraction system 225 may generate baselines of an entire line of the image. Alternatively, the baseline extraction system 225 may generate baselines of only the spine region of the image. Accordingly, in an embodiment, spine region of interest extractor 230 may extract the letter information for the spine region of the image. This information may be provided to the top/bottom baseline extractor 235, which may extract two dominant baselines from the spine region.

Figure 9:
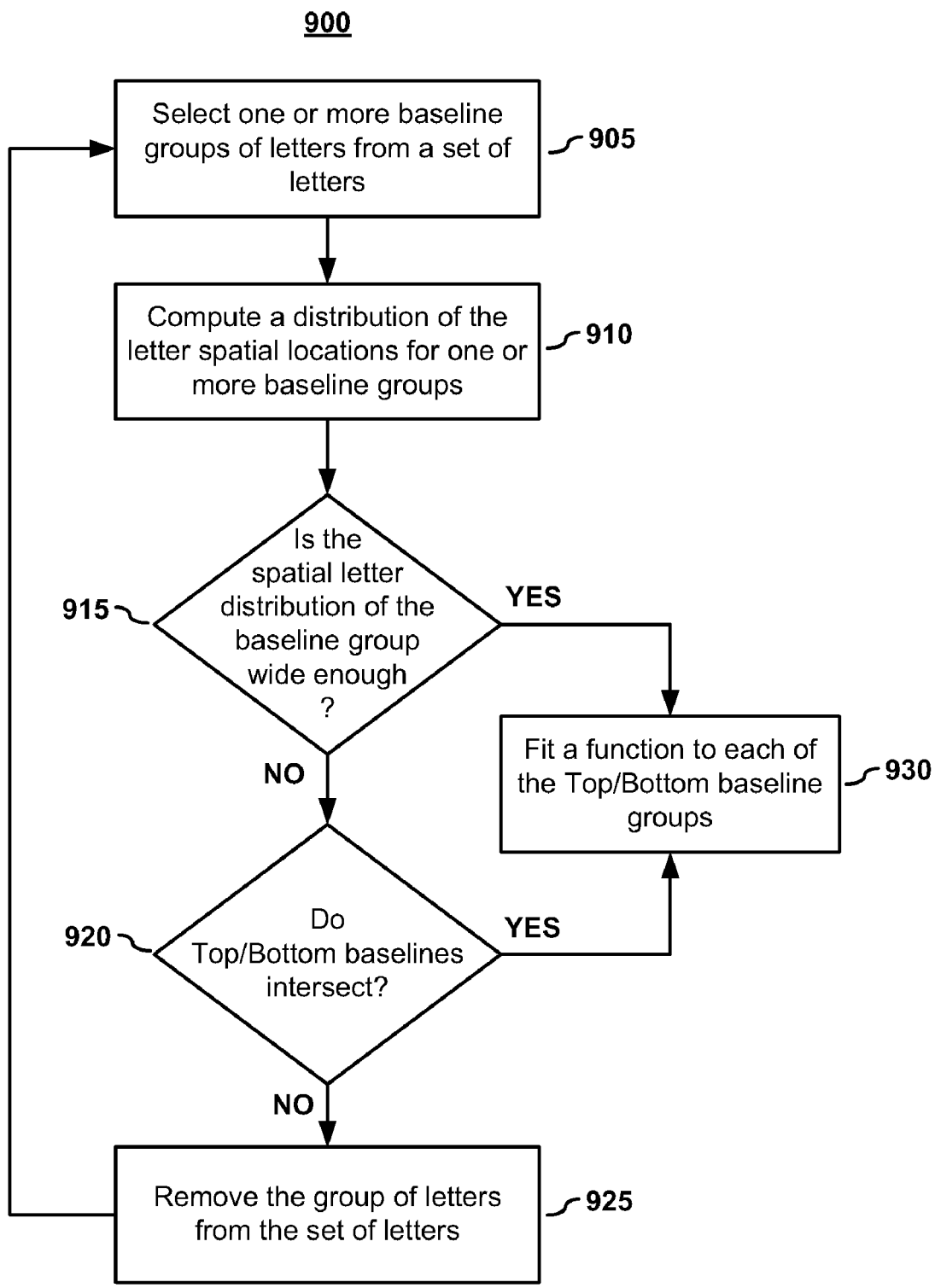
FIG. 9 depicts a method for extracting and validating two dominant baselines according to an embodiment of the invention.

FIG. 9 depicts an embodiment of a method that may be employed by top/bottom baseline extractor 235 for extracting a top and bottom baselines according to an embodiment of the present invention. As depicted in the illustrated embodiment, the method begins by selecting or extracting (905) one or more baseline groups of letters from a set or convex hull of letters. In an embodiment, the set of letters may be selected from letters within the spine region of the image.

In embodiments, the method for extracting baseline depicted in FIG. 8 may be used to extract baselines. For example, in an embodiment, for each letter region, a point on the letter region may be selected to form a set of points corresponding to the set of letter regions. In an embodiment, the point for a letter region may be a point on the bottom-mid of the letter region, or alternatively may be a centroid of the letter region. One skilled in the art shall recognize that the selection of the position of the point is not critical to the present invention.

From the set of points, the extreme labeled letters (e.g., top and bottom) may be identified. As noted previously with respect to the embodiment presented in FIG. 8, by fitting a minimum area rectangle to the set of points, it is possible to identify which labeled letters belong to a top baseline and/or which labeled letters belong to a bottom baseline. In an embodiment, a top baseline group of letters may be selected as those letter regions that are intersected by the top boundary of the minimum area rectangle or are within a threshold distance of the top boundary, and a bottom baseline group of letter may be selected as those letter regions that are intersected by the bottom boundary of the minimum area rectangle or are within a threshold distance of the bottom boundary. Because the spine region is typically subjected to warping, the threshold distance that letter regions may be away from a boundary of the minimum area rectangle may be substantial. As the threshold distance increases, the risk of incorrectly selecting an interior letter region as a boundary letter region also may also increase. Thus, in an embodiment, a convex hull of the set of points may be form to identify the extreme letter regions of the convex hull. Letter regions selected as being at or near a minimum area rectangle boundary may be checked to ensure that they also reside at a boundary of the convex hull.

For each of the top and bottom baseline groups of letters, a distribution of the letter regions' spatial locations may be calculated (910). In an embodiment, the distribution may be of the letter points. The distribution information may be used as a validation factor, and a check may be made to determine (915) if the spatial distribution of the letters for each of the baselines is sufficiently wide. The baseline group of letters may be considered valid if the spatial letter distribution of the baseline group exceeds a validation threshold value. The threshold value may be preset, user selected, or may be automatically determined by examining the distribution of all or a portion of the letters.

Validation is beneficial because it helps ensure the selection of representative or dominant baselines. Consider, for purposes of illustration, the image depicted in FIG. 12C. FIG. 12C depicts an input image after having been pruned, segmented (which includes removing shading), and de-skewed, and which is ready for baseline extraction. Assume that a baseline is extracted corresponding to the letter information which forms the line of content 1230. The letter information which forms the line of content 1230 may be a page header, part of a chart, line art, figure, or some other foreground content. It should be noted that a baseline for that content results in a baseline that is relatively short and unlikely to yield a representative baseline for unwarping. Similarly, consider the letter information that forms item 1235, which may be a page number of the document. A baseline for that content will also result in a baseline that is short and not likely to be representative. Accordingly, a validation check on the distribution of the letters that form the content 1230 and 1235 is beneficial to help ensure dominant baselines are extracted.

If the spatial distribution does not exceed a validation threshold value, a check may be made to determine (920) if the top and bottom baselines intersect. If they do not intersect, those groups of letter regions (e.g., 1230 and 1235) may be excluded (925) from the convex hull of the letter regions, and the process may be repeated. In the next iteration, in the illustrated example, baselines 1240 and 1245 may be extracted, which have valid spatial distributions and are better baselines for unwarping.

A check to determine if the two baselines intersect indicates if all of the possible baselines have been extracted and have been discarded. In an embodiment, if no baselines with acceptable distributions are identified, the two baselines with the best distributions may be selected.

After selection of a group letters for a baseline, the baseline may be fit to a function. In an embodiment, for each baseline, all letter regions belonging to the baseline may be extracted. For each corresponding letter region, a point on the letter region may be selected. In an embodiment, the point for the letter region may be a point on the bottom-mid of the letter region or alternatively may be a centroid of the letter region. One skilled in the art shall recognize that the selection of the position of the point is not critical to the present invention. In an embodiment, a baseline function may be estimated for the baseline by fitting a p-th order polynomial to those points. In an embodiment, a second order polynomial (e.g., $y=a_n x^2 + b_n x + c_n$) may be fit to the points. The coefficients (or characteristics) of the top/bottom polynomials may be used to unwarp the image.

5. Unwarping of the Image

The unwarper 245 may receive as an input the image and the top and bottom baseline functions. The characteristics of the baseline functions may be used to unwarp the image, thereby straightening the baselines to obtain the output image 255. It shall be noted that, in embodiments, the unwarping may be applied only to the foreground pixels of the image as the background may be assumed to be a set color and may be used to fill the pixels not occupied by unwarped foreground pixels. In embodiments, only the portions of baselines that are within the spine region of the image may be unwarped.

Figure 10:
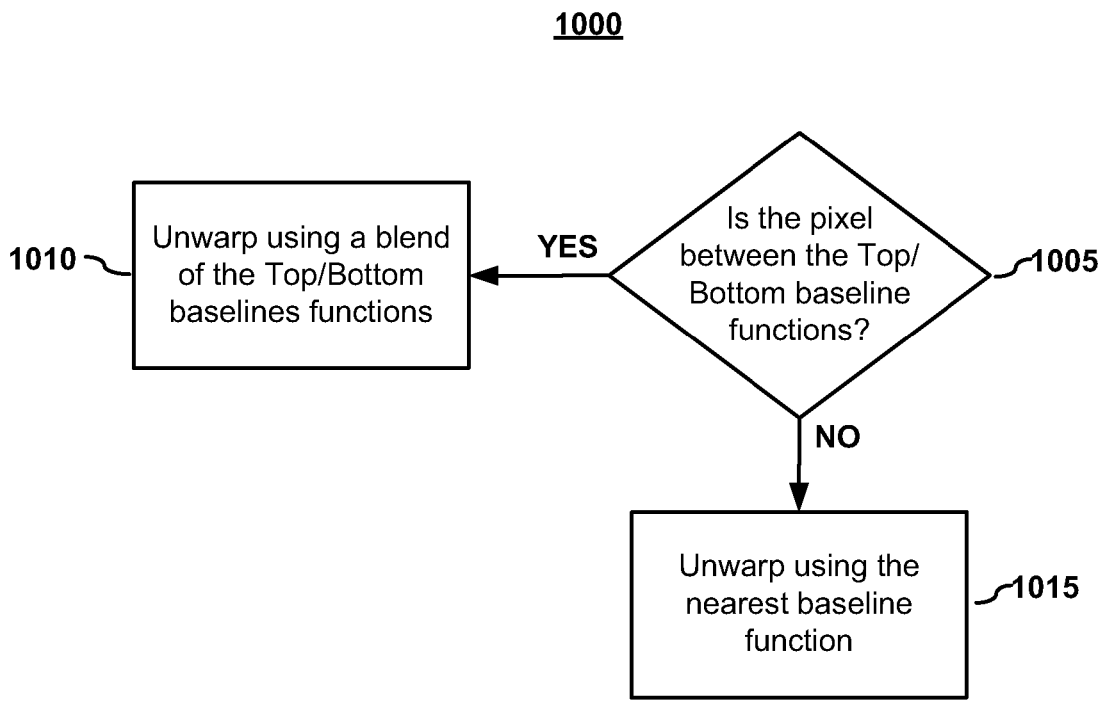
FIG. 10 depicts a method for unwarping an image using two dominant baselines according to an embodiment of the invention.

FIG. 10 depicts a method for unwarping an input image using two baseline functions according to an embodiment of the present invention. In embodiments, if the pixel lies (1005) between the top and bottom baseline functions, the unwarping may be obtained (1010) by blending the characteristics of the top and bottom baseline functions. In an embodiment, the blending of the two baseline functions may be weighted with more weight applied to the closer of the two baseline functions. Thus, the location of this pixel in the output image may be obtained by the blended baselines. It shall be noted that the blended embodiments provide a smooth page unwarping quality.

An embodiment of a formulation of the blending may be summarized as:

$$(u, v) = f(x, y; pB, pT, c_0)$$

where (u, v) is a two-dimensional point in the unwarped image; (x, y) is a two-dimensional point in the input image; pB is a polynomial coefficients of a bottom baseline; pT is a polynomial coefficients of a top baseline; and co is a spine/non-spine region divider.

A pixel that is not between the top and bottom baseline functions may be unwarped (1015) using the nearest baseline function. In an embodiment, the unwarping may include an adjustment for the shift between the pixel location and the nearest baseline function. One skilled in the art shall recognize that by using only two dominant top and bottom baselines rather than every possible baseline, the unwarping is less computationally intensive and faster.

Figure 11:
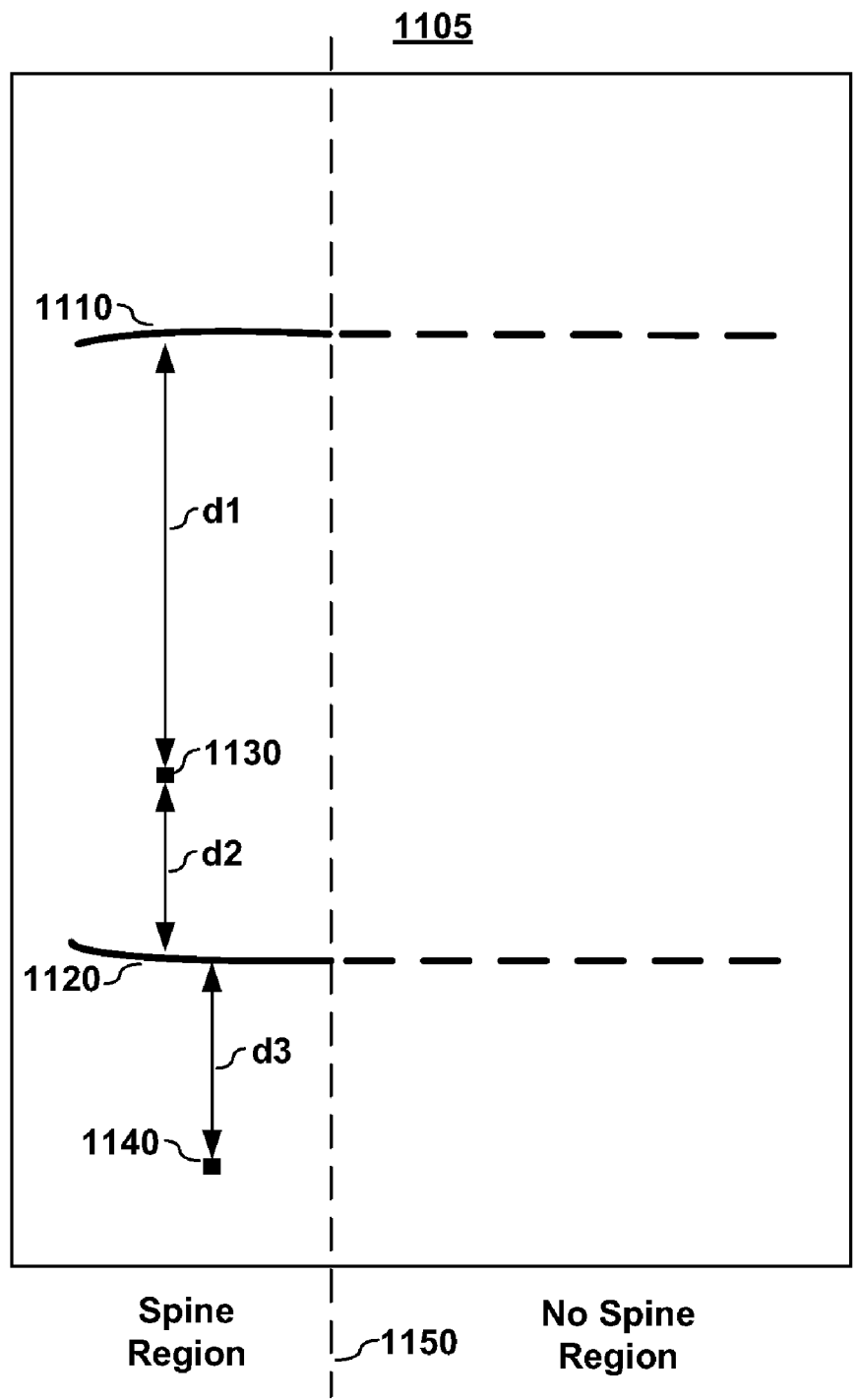
FIG. 11 graphically depicts, for purposes of illustration, a portion of an image that may be unwarped using two dominant baselines according to an embodiment of the invention.

FIG. 11 graphically a method for unwarping an image using top and bottom baseline functions according to an embodiment of the present invention. Consider the image 1105 that has a top baseline function 1110 and a bottom baseline function 1120. Also identified in FIG. 11 is the spine/no spine region divider 1150, wherein the spine region is on the left side of the divider 1150 and the no spine region is on the right side of the divider 1150. For a pixel 1130 within the spine region and between the two baselines 1110, 1120, the pixel may be unwarped using a blend of the top and bottom baseline functions. In an embodiment, the blend may be a weighted blend based upon the pixel's location between the two baselines. For example, in an embodiment, a weighted factor for the top baseline function 1110 may be:

$$w_1 = \frac{d2}{d1 + d2},$$

and a weighted factor for the bottom baseline function 1120 may be:

$$w_2 = \frac{d1}{d1 + d2}.$$

In an embodiment, if the pixel is within the spine region and is not between the top and bottom baseline functions, such as pixel 1140, the pixel may be unwarped by using the characteristics of the nearest baseline, in this illustrated case, baseline 1120. In an embodiment, the distance, d3, the pixel 1140 is from the dominant baseline 1120 may be used as a shift when applying the baseline characteristics during unwarping. One skilled in the art shall recognize that other methods for applying one or more characteristics of a function or functions to unwarp the image or a portion thereof may also be used.

6. Sample Results

Figure 12A:
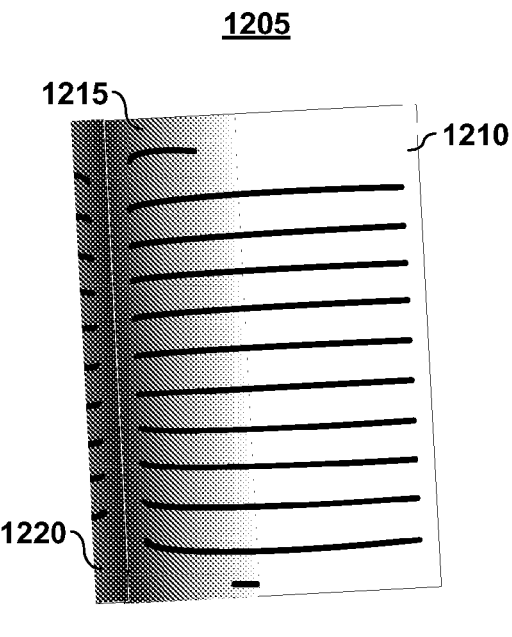
FIGS. 12A, 12B, 12C, and 12D graphically depict, for purposes of illustration, examples of an image at various stages of removing or reducing the distortion in the image according to embodiments of the invention.
Figure 12B:
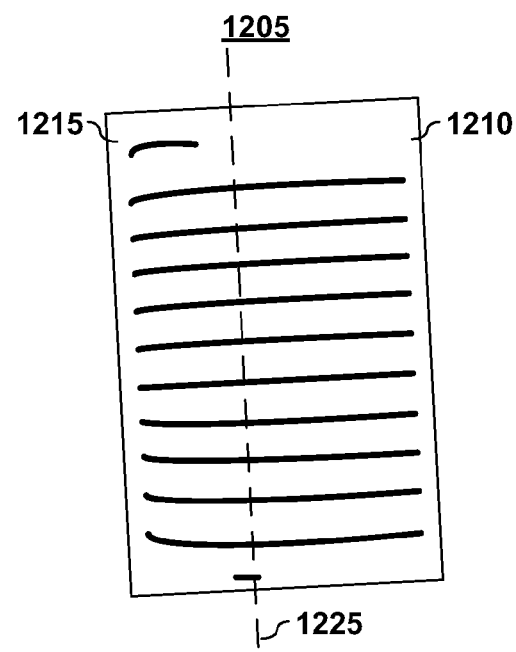
Figure 12C:
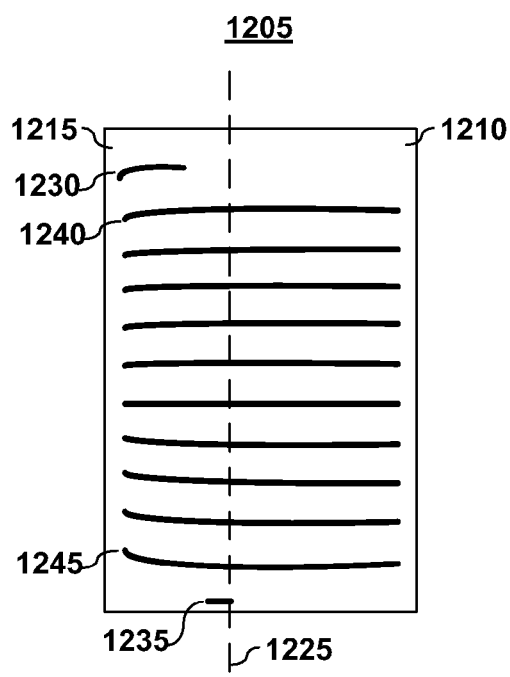
Figure 12D:
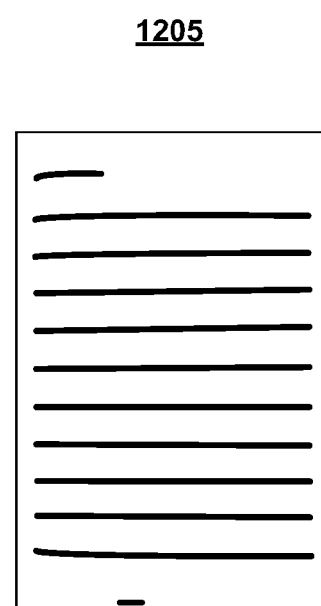

FIGS. 12A-12D graphically depict, for purposes of illustration, examples of an image at various stages of removing or reducing the distortion in the image according to embodiments of the invention. FIG. 12A graphically depicts the input image 1205. Input image 1205 has been copied askew, possesses shading, and a portion of another page 1220. FIG. 12B depicts image 1205 after preprocessing and segmentation. A spine/no spine region divider 1225 has been identified which divides the image 1205 into a spine region 1215 and a no spine region 1210. FIG. 12C graphically depicts the input image 1205 after being de-skewed. Finally, FIG. 12D graphically depicts the unwarped image after two dominant (top/bottom) baseline functions 1240, 1245 had been extracted and the image 1205 has been unwarped using the characteristics of the dominant baselines.

It shall be noted that present invention may be used with different types of content, different types of layout profiles, and different page alignments. Aspects of the present invention may also be utilized for images obtained from bound or flat documents. Furthermore, it shall be noted that references to top and bottom baselines may be considered arbitrary as different frames of reference or orientations may be used. For example, the present invention may be adapted for use with left and right dominant baselines, or other configurations.

One skilled in the art shall recognize that application of the teachings of the present invention can produce remarkable results in removing distortion in an input image. One skilled in the art shall also recognize that the teachings of the present invention may be embodied in methods and systems that are computationally fast in reducing or removing the distortion in an image.

Aspects of the present invention may be implemented in any device or system or combination of devices or systems capable of performing according to the teachings of the present invention. Such devices and/or systems include, but are not limited to, a computer or a device with one or more processors. Furthermore, within any of the systems or devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application-specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A method for removing or reducing the distortion in an image comprising pixels, the method comprising:
   locating a set of letter regions in the image;

selecting a point for each letter region to form a set of points corresponding to the set of letter regions;

fitting a minimum area rectangle to the set of points;

grouping as a first set of letter regions those letter regions that are intersected by or are within a first threshold distance of a first boundary of the minimum area rectangle and that are on a boundary of a convex hull of the set of letter regions;

grouping as a second set of letter regions those letter regions that are intersected by or are within a second threshold distance of a second boundary of the minimum area rectangle and that are on the boundary of the convex hull of the set of letter regions;

using a characteristic of at least one of the first and second sets of letter regions to reduce distortion in at least a portion of the image; and responsive to a spatial distribution of letter regions of at least one of the first set of letter regions and the second set of letter regions not exceeding a distribution threshold value and responsive to the first set of letter regions and the second set of letter regions not intersecting:

forming a reduced set of letter regions by removing from the set of letter regions those letter regions corresponding to the set of letter regions selected from the first and the second sets of letter regions that has a spatial distribution that does not exceed the distribution threshold value;

fitting a subsequent minimum area rectangle to a reduced set of points corresponding to the reduced set of letter regions; and for each of the first and second sets of letter regions that did not exceed the distribution threshold value, identifying a replacement set of letter regions that are intersected by or are within its respective threshold distance of a boundary of the subsequent minimum area rectangle and that are on a boundary of a convex hull of the reduced set of letter regions.

2. The method of claim 1 further comprising the step of:
generating an intensity distribution of the image;
identifying a divider that divides the image into a spine region and a no-spine region at a location in the image corresponding to an intensity threshold value in the intensity distribution.

3. The method of claim 2 further comprising:
selecting the set of letter regions from the spine region of the image;
fitting a first baseline function to the first set of letter regions and fitting a second baseline function to the second set of letter regions; and
wherein the step of using a characteristic of at least one of the first and second sets of letter regions to reduce distortion in at least a portion of the image comprises:
responsive to a pixel in the image being located between the first baseline function and the second baseline function, unwarping the pixel by using a blend of the first baseline function and the second baseline function; and
responsive to a pixel in the image not being located between the first baseline function and the second baseline function, unwarping the pixel by using the closer of the first and second baseline functions and a shift related to the distance between the pixel's location and the closer baseline function.

4. The method of claim 2 further comprising:
selecting the set of letter regions from the no-spine region of the image; and
wherein the step of using a characteristic of at least one of the first and second sets of letter regions to reduce distortion in at least a portion of the image comprises:
calculating an angle of at least one of the first and second sets of letter regions; and
using the angle to calculate a skew angle; and
rotating at least a portion of the image using the skew angle.

5. The method of claim 4 wherein the step of calculating an angle of at least one of the first and second sets of letter regions comprises the steps of:
calculating an angle of the minimum area rectangle; and
using the angle to calculate the skew angle.

6. The method of claim 1 wherein the steps of locating a set of letter regions in the image and selecting a point for each letter region to form a set of points corresponding to the set of letter regions comprises:
segmenting the image into foreground pixels and background pixels;
applying a connected component analysis to at least some of the foreground pixels to form letters;
fitting a region each of the letters; and
selecting a point for each letter region.

7. The method of claim 6 further comprising the step of:
responsive to a distance between letter regions being less than a single letter threshold value, merging the letter regions into a single letter region.

8. The method of claim 1 further comprising the step of:
for each of the first and second sets of letter regions that did not exceed the distribution threshold value, storing information which identifies its spatial distribution and the letter regions that comprise the set; and
responsive to a spatial distribution of letter regions of at least one of the first and the second sets of letter regions not exceeding the distribution threshold value and responsive to the first and the second sets of letter regions intersecting:
responsive to the first set of letter regions not exceeding the distribution threshold value, using the stored information to identify the first set of letter regions with the best spatial distribution; and
responsive to the second set of letter regions not exceeding the distribution threshold value, using the stored information to identify the second set of letter regions with the best spatial distribution.

9. A non-transitory medium comprising one or more sequences of instructions to direct one or more instruction-executing devices to perform at least the steps of claim 1.

10. A method for removing or reducing the distortion in an image comprising pixels, the method comprising:
segmenting the image into foreground pixels and background pixels;
forming the foreground pixels into discrete groups;
fitting a region to each of the discrete groups to form a set of regions;
selecting a point for each of the regions to form a set of points corresponding to the set of regions;
fitting a minimum area rectangle to the set of points;
associating a first set of regions with a first boundary of the minimum area rectangle and associating a second set of regions with a second boundary of the minimum area rectangle;
fitting a first baseline function to the first set of regions and fitting a second baseline function to the second set of regions;
responsive to a pixel in the image being located between the first baseline function and the second baseline function, unwarping the pixel by using a blend of the first and the second baseline functions;

responsive to a pixel in the image not being located between the first baseline function and the second baseline function, unwarping the pixel by using the closer of the first and second baseline functions and a shift related to the distance between the pixel's location and the closer baseline function; and responsive to a spatial distribution of regions of at least one of the first set of regions and the second set of regions not exceeding a distribution threshold value and responsive to the first set of regions and the second set of regions not intersecting:

forming a reduced set of regions by removing from the set of regions those regions corresponding to the set of regions selected from the first and the second sets of regions that has a spatial distribution that does not exceed the distribution threshold value;

fitting a subsequent minimum area rectangle to a reduced set of points corresponding to the reduced set of regions; and for each of the first and second sets of regions that did not exceed the distribution threshold value, identifying a replacement set of regions that are intersected by or are within its respective threshold distance of a boundary of the subsequent minimum area rectangle and that are on a boundary of a convex hull of the reduced set of regions.

11. The method of claim 10 further comprising the step of: generating an intensity distribution of the image;

identifying a divider that divides the image into a spine region and a no-spine region at a location in the image corresponding to an intensity threshold value in the intensity distribution.

12. The method of claim 11 further comprising:

extracting at least one baseline from the no-spine region of the image;

calculating a skew angle using the at least one baseline; and rotating at least a portion of the image using the skew angle.

13. The method of claim 10 further comprising the step of:

for each of the first and second sets of regions that did not exceed the distribution threshold value, storing information which identifies its spatial distribution and the letter regions that comprise the set; and responsive to a spatial distribution of regions of at least one of the first and the second sets of regions not exceeding the distribution threshold value and responsive to the first and the second sets of regions intersecting:

responsive to the first set of regions not exceeding the distribution threshold value, using the stored information to identify the first set of regions with the best spatial distribution; and responsive to the second set of regions not exceeding the distribution threshold value, using the stored information to identify the second set of regions with the best spatial distribution.

14. A non-transitory medium comprising one or more sequences of instructions to direct one or more instruction-executing devices to perform at least the steps of claim 10.

* * * * *